July 12, 1949. H. O. IRMSCHER 2,475,617
INFUSION PACKAGE MANUFACTURE
Filed July 9, 1942 11 Sheets-Sheet 7
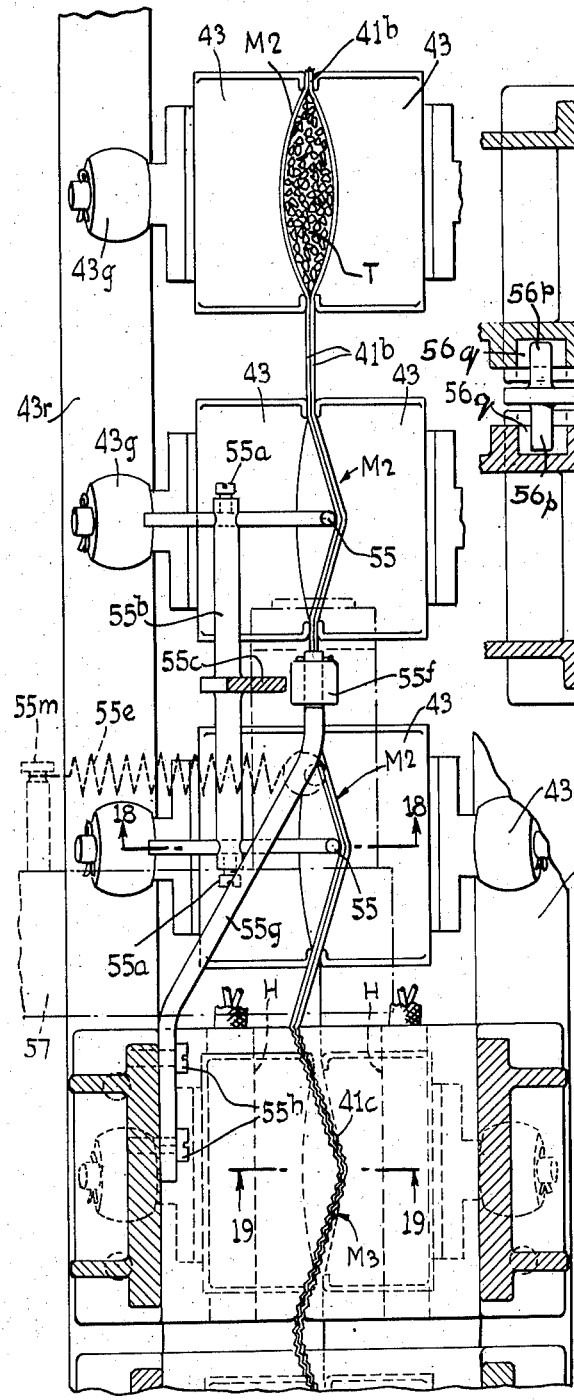
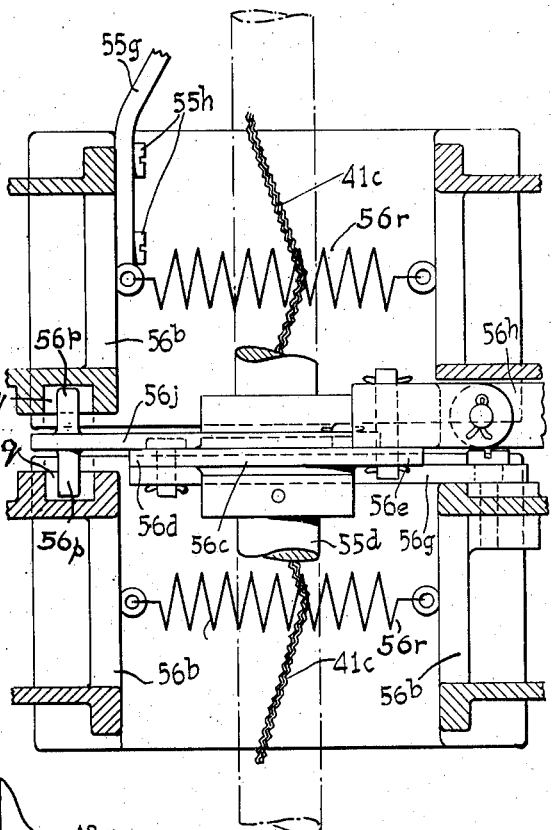
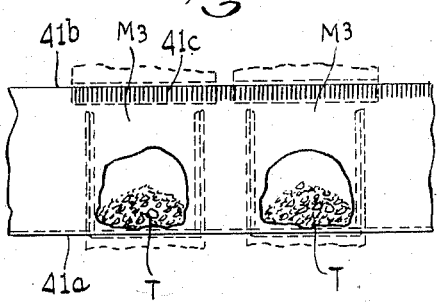
INVENTOR.
HANS O. IRMSCHER
BY
Louis Barnett
ATTORNEY

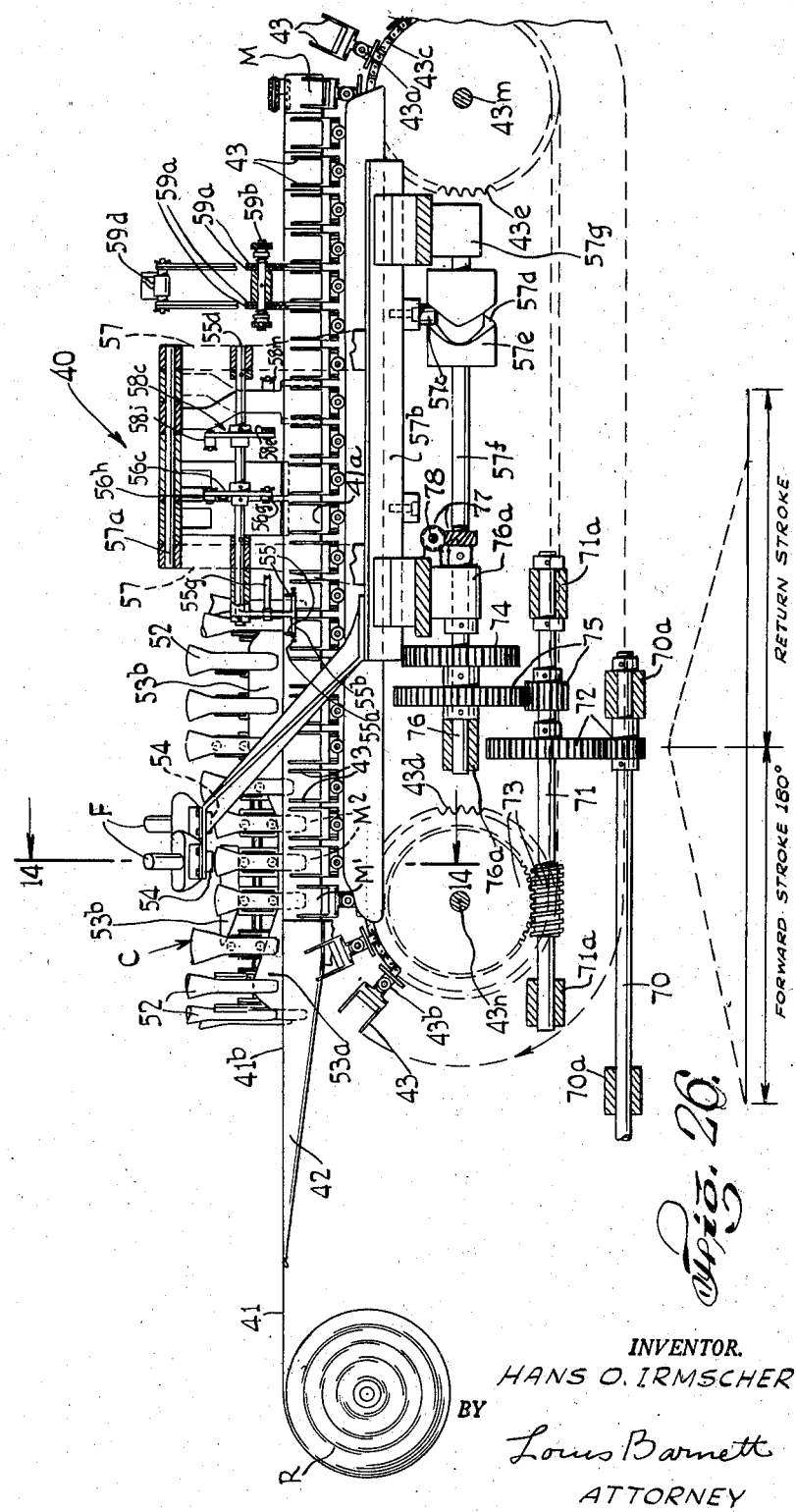

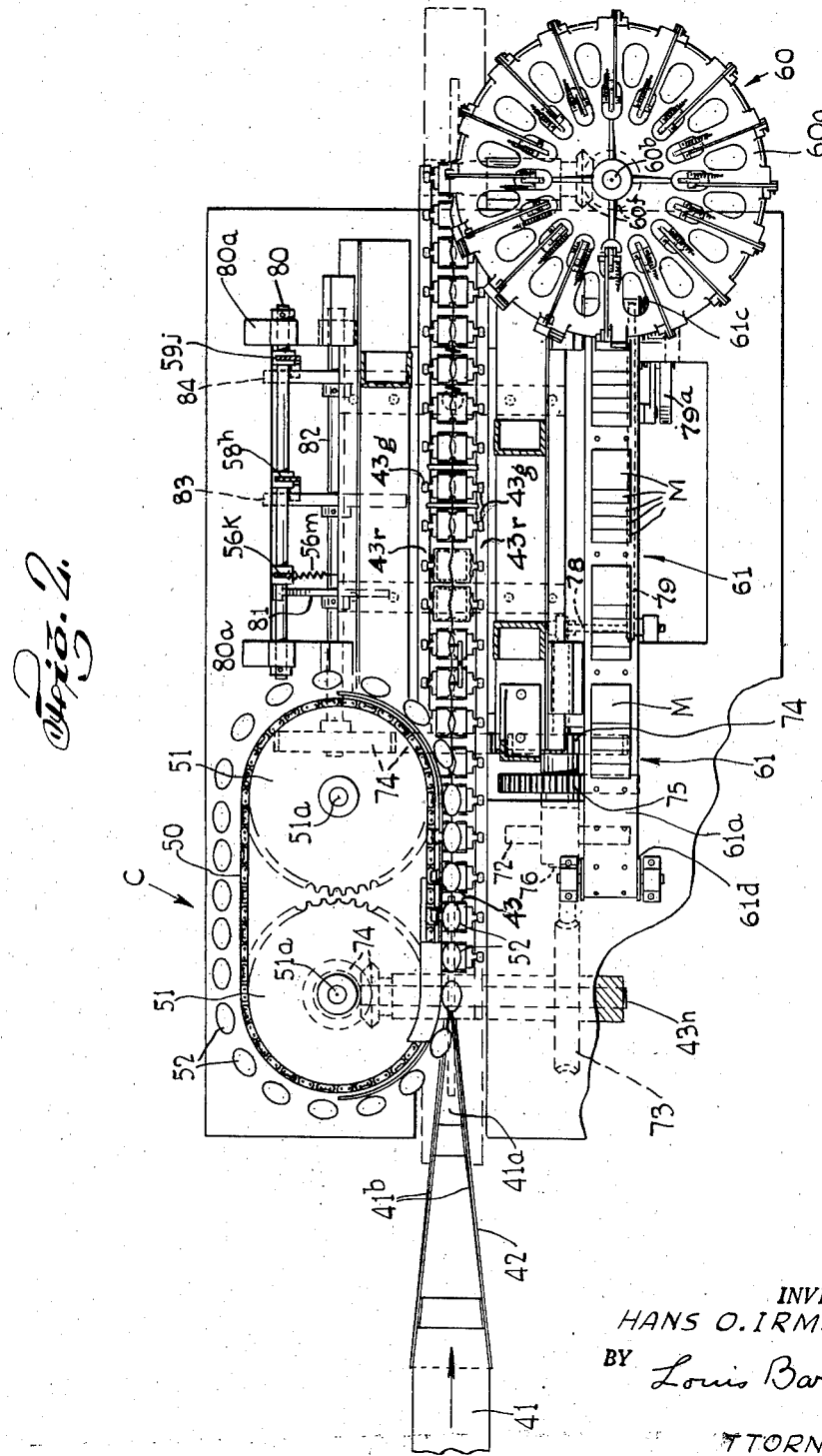

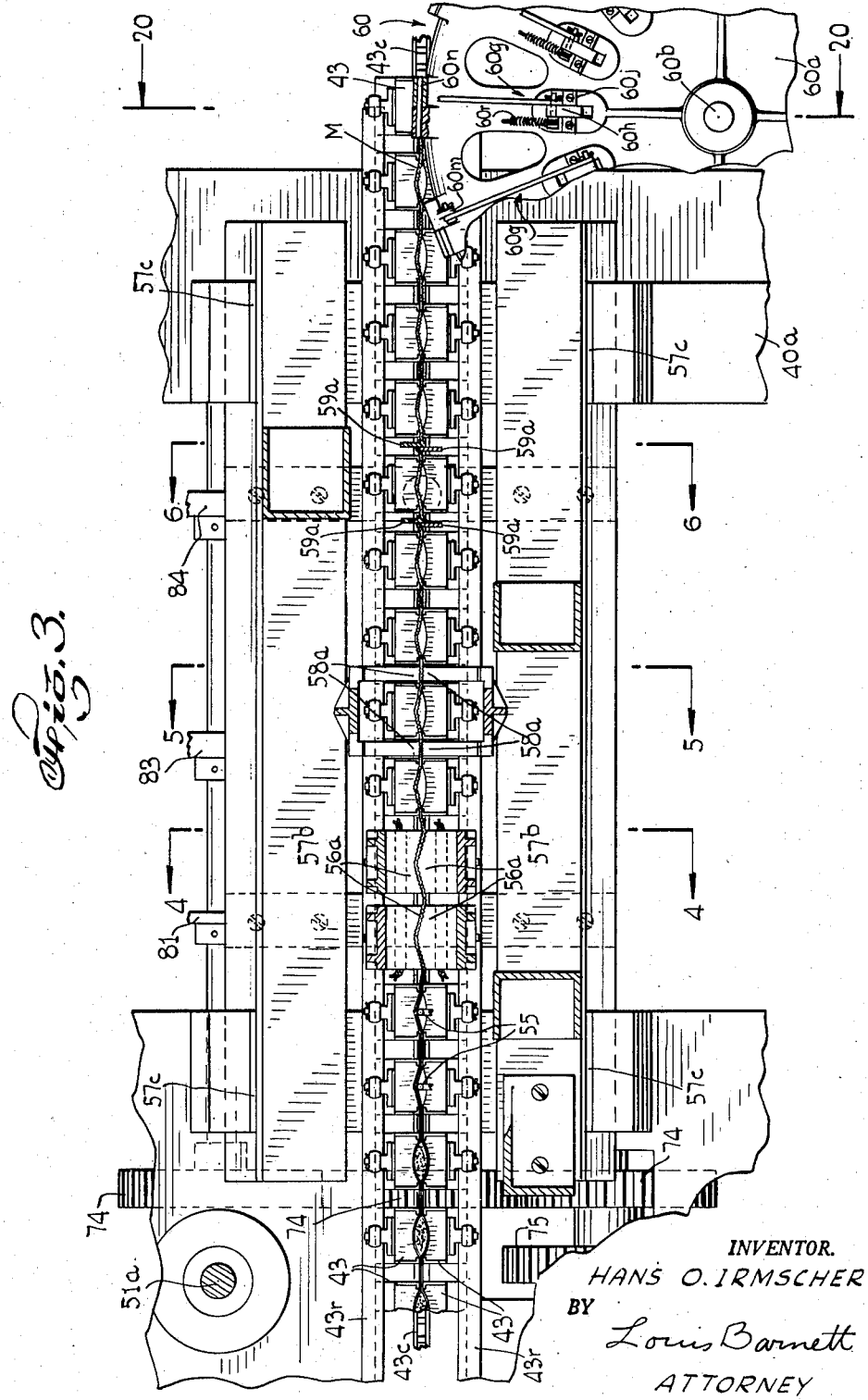

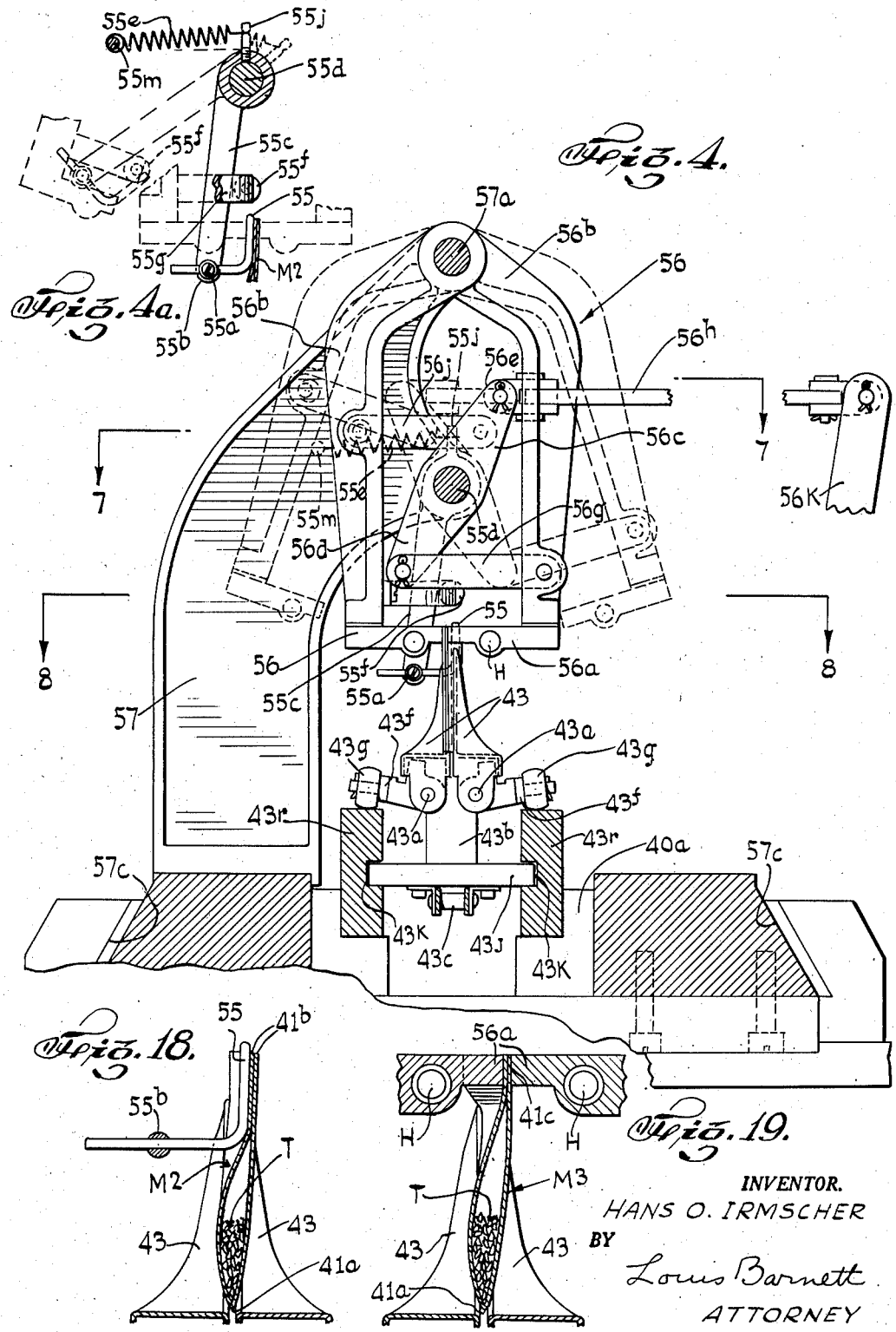

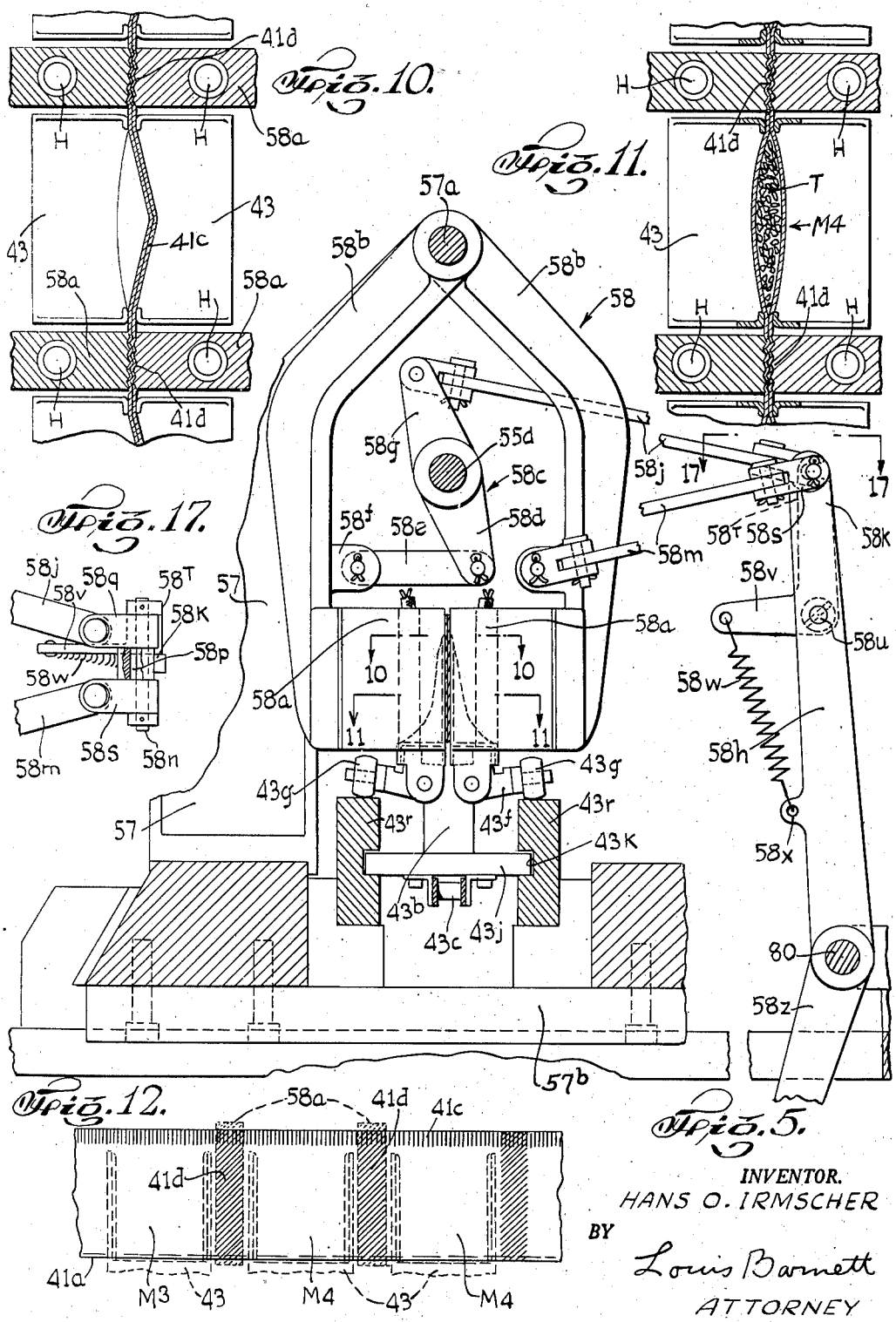

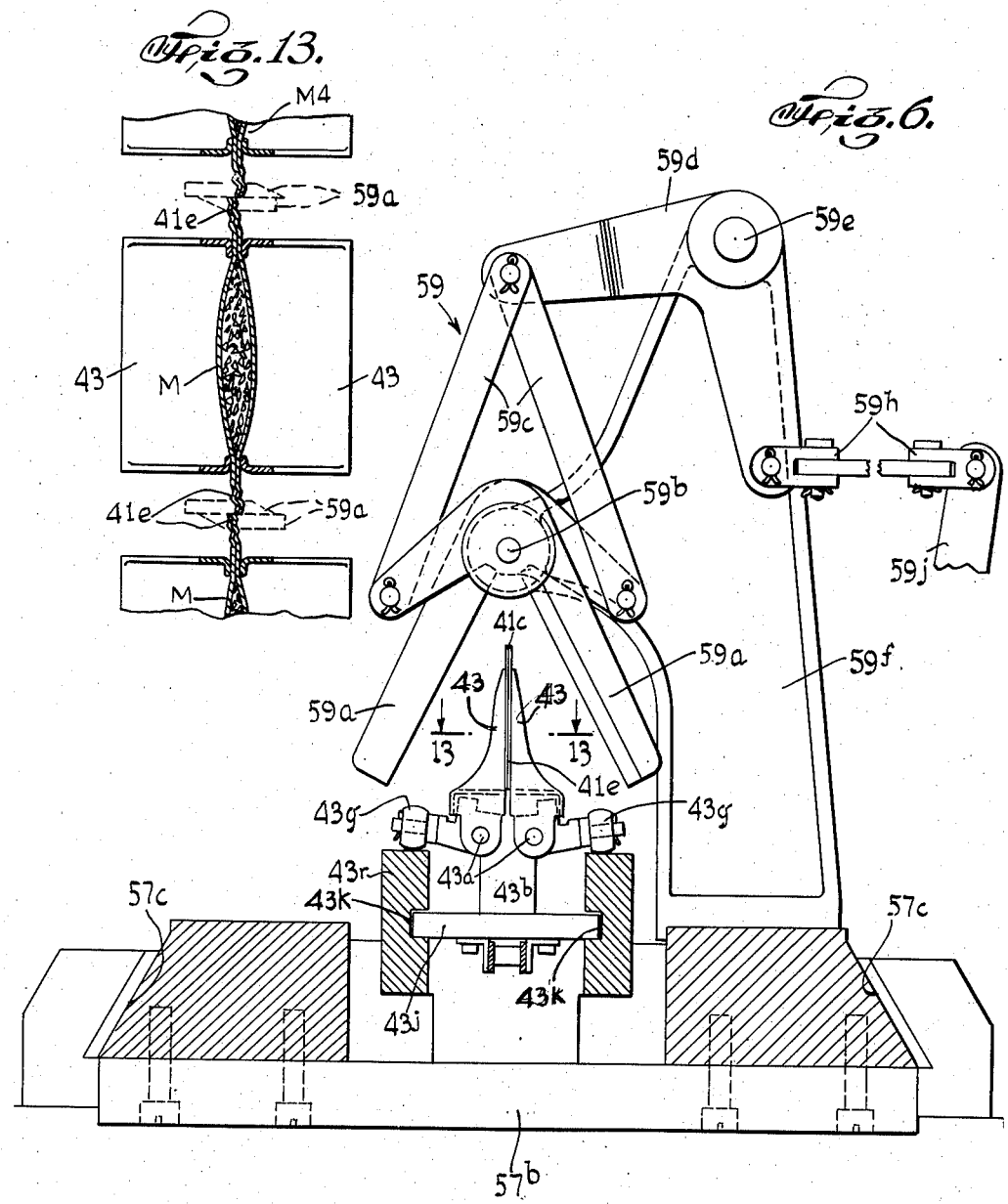

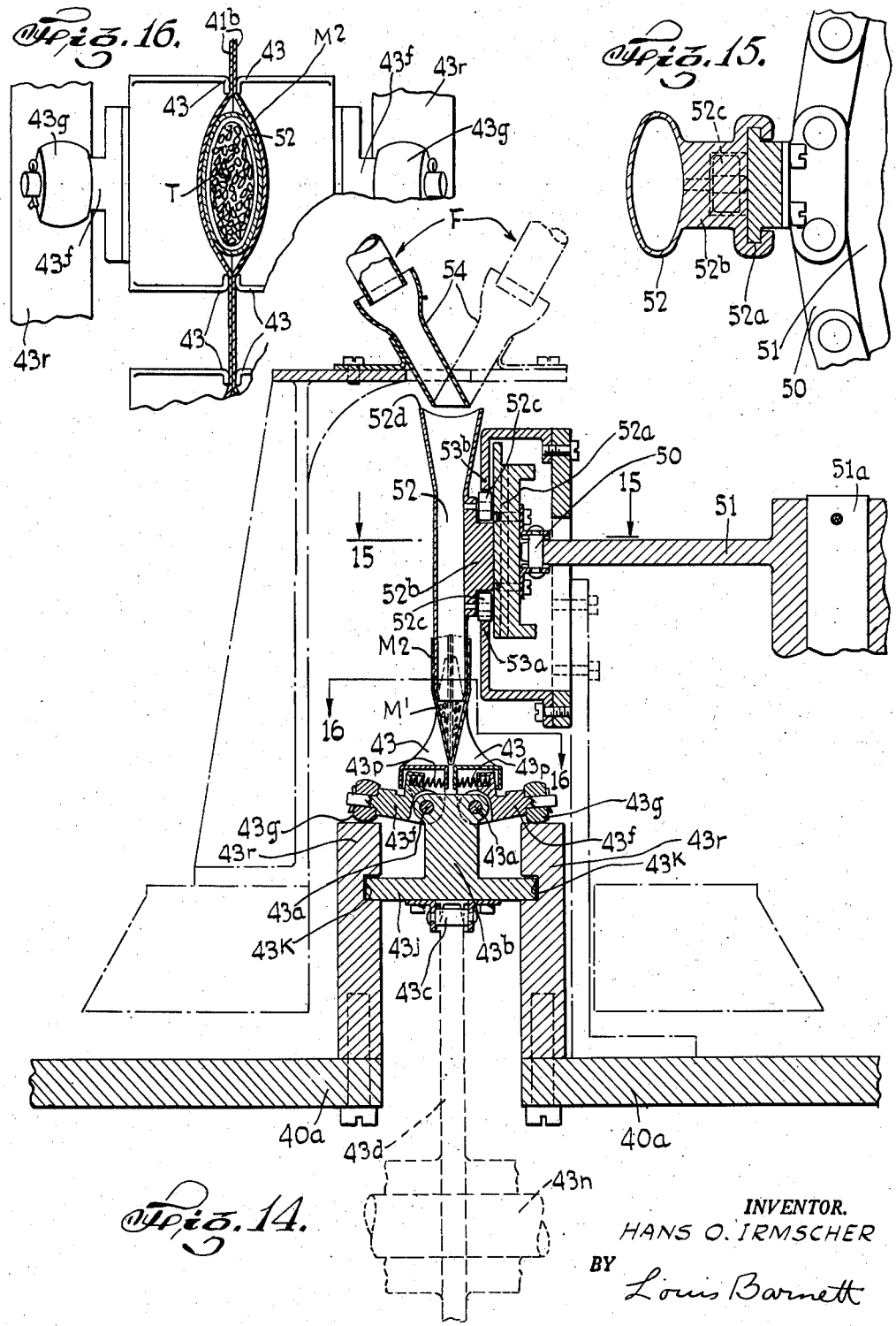

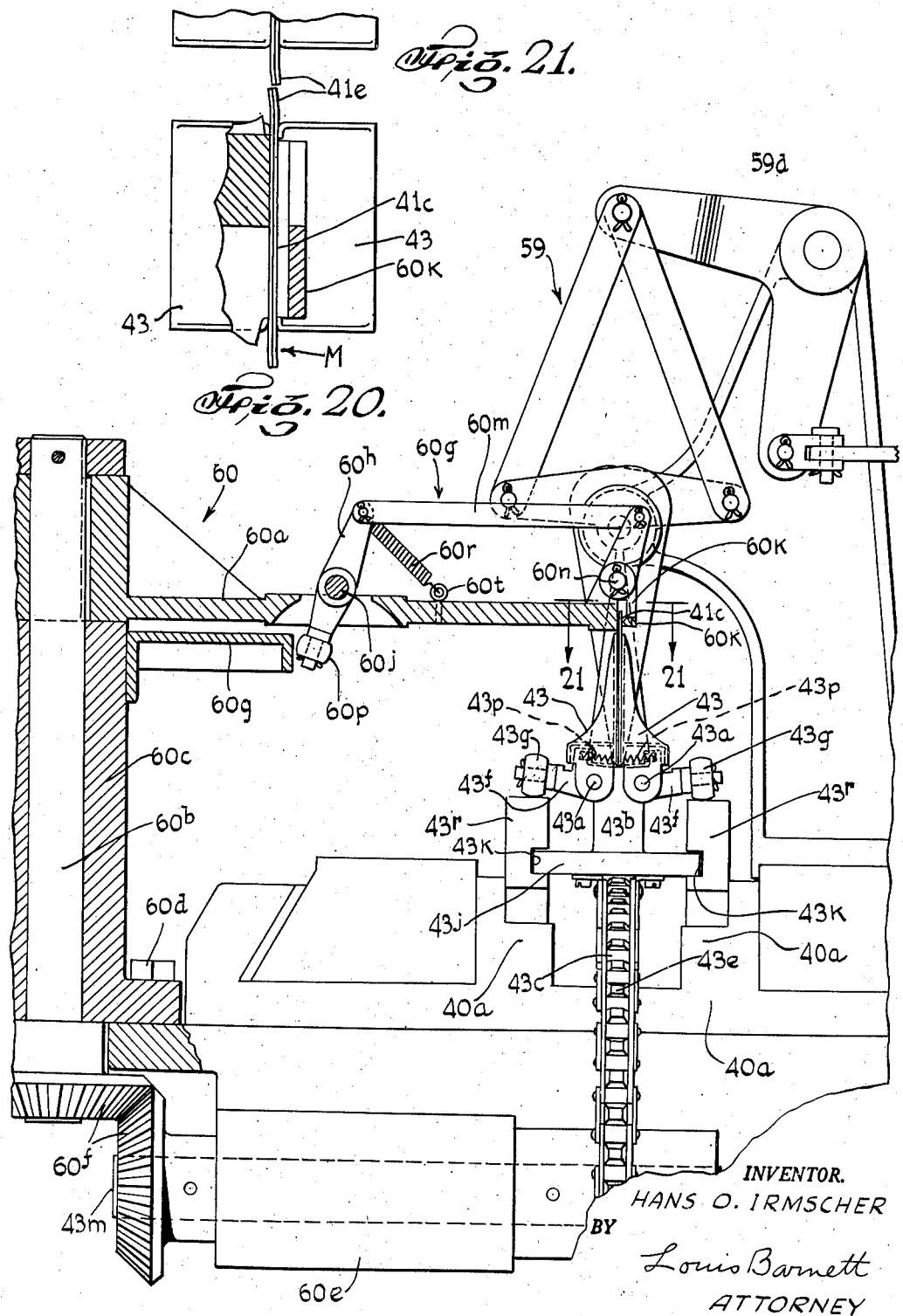

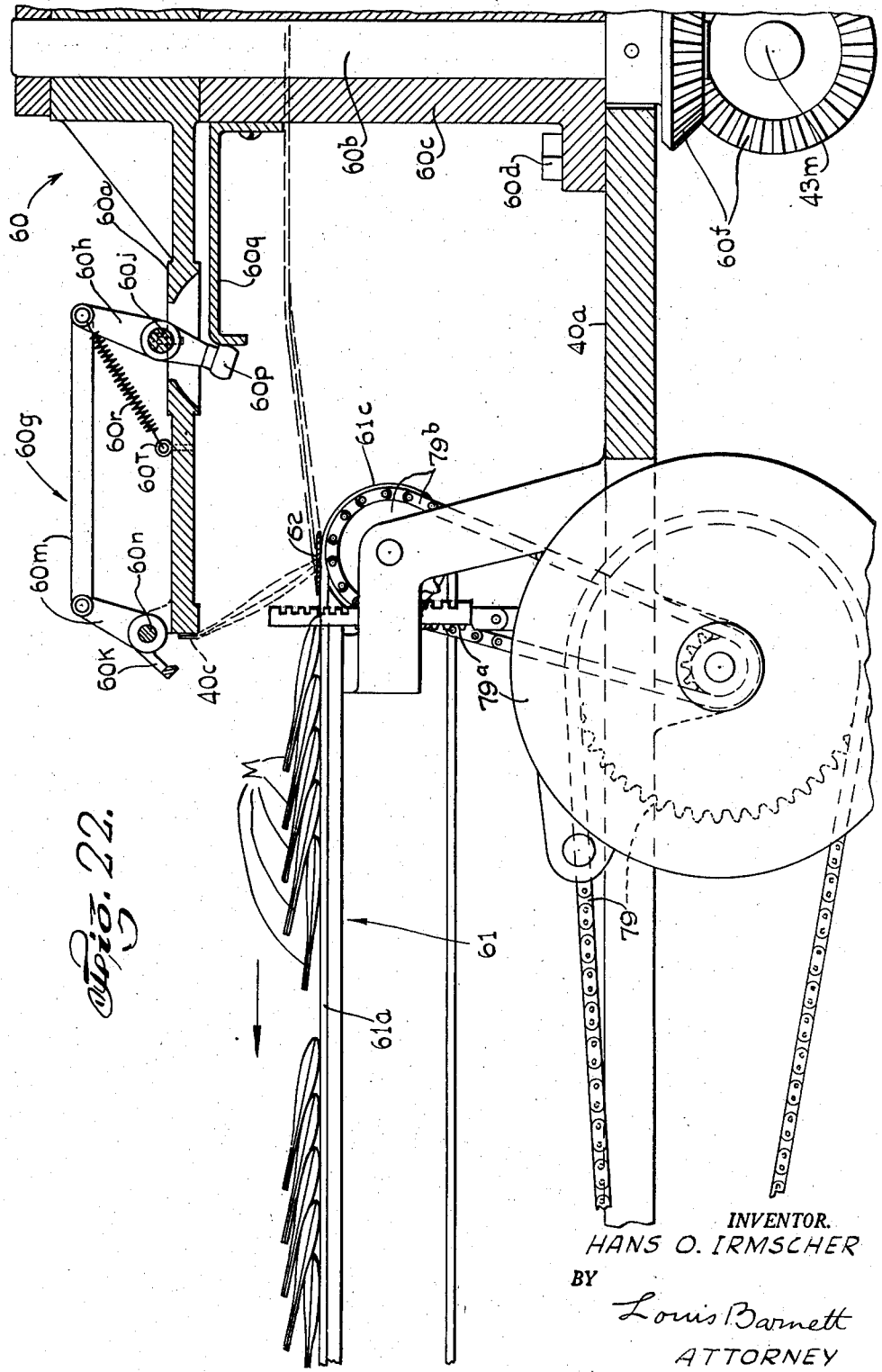

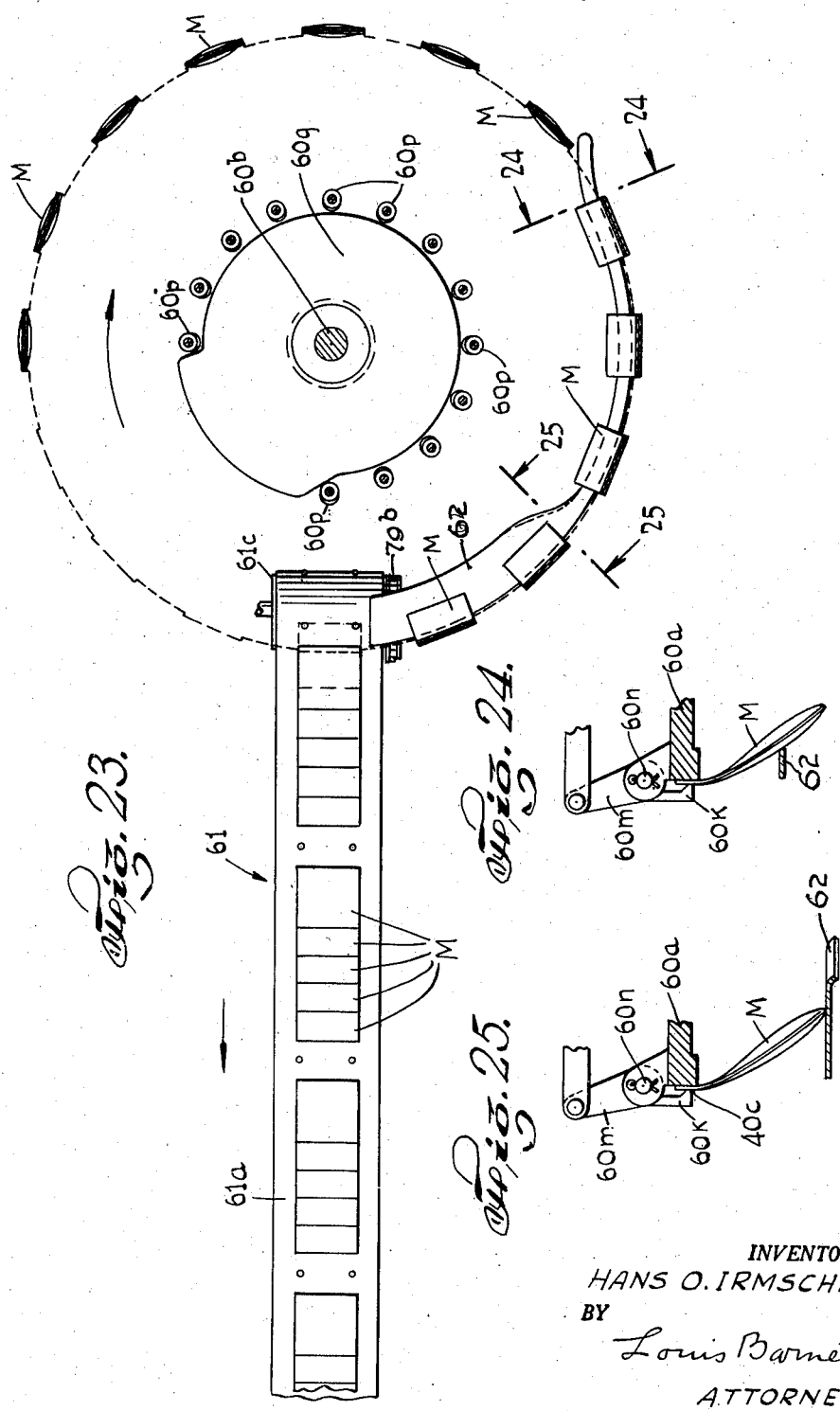

Patented July 12, 1949

2,475,617

UNITED STATES PATENT OFFICE 2,475,617

INFUSION PACKAGE MANUFACTURE

Hans O. Irmscher, East Hempstead, N. Y., assignor to National Urn Bag Co., Inc., Long Island City, N. Y., a corporation of New York Application July 9, 1942, Serial No. 450,289

15 Claims. (Cl. 93—3)

1

This invention relates to an infusion package manufacture. More particularly the invention is directed to full automatic machines for making complete articles, such as tea balls or other essence containing packages in quantity production at rate of speed higher than heretofore and an improved method of manufacture and delivery thereby ready for shipment.

Among the objects of the invention is to provide an improved machine and method of the character described comprising relatively few and simple parts which shall form a combination of compactly arranged cooperating mechanisms for automatically performing all the various operations necessary to completely manufacture infusion packages and to deliver the same continuously in counted groups ready for packing in shipping containers, which shall require minimum attention in operation, which shall be inexpensive to construct yet have a relative larger output capacity than any heretofore, which shall be smooth running and practically free from vibrations, and which shall be practical and efficient to a high degree in use.

Other objects of this invention will in part be obvious and in part hereinafter pointed out.

The invention accordingly consists in steps of the method of manufacture and features of construction, combinations of elements and arrangement of machine parts which will be exemplified in the method and construction hereinafter described and of which the scope of application will be indicated in the following claims.

Fig. 1 is a front elevational view of a tea-ball making machine, partly in section, constructed to embody the invention.

Fig. 2 is a plan view of the improved machine shown in Fig. 1, partly in section.

Fig. 3 is a fragmentary plan view showing enlarged mid-portion of the machine for top sealing, side edge sealing and severing the individual filled packages, partly in section.

Figs. 4, 5, and 6 are sectional views taken on lines 4—4, 5—5 and 6—6, respectively, in Fig. 3 showing the top sealing, side edge, sealing and severing portions, respectively.

Fig. 4a is a fragmentary side elevational view showing the temporary closure operation.

Figs. 7 and 8 are fragmentary cross-sectional views of the top sealing portion machine as seen from lines 7—7 and 8—8, respectively, in Fig. 4.

Fig. 9 is a fragmentary side elevational view showing the permanent top heat of the bag sections operation.

Figs. 10 and 11 are cross sectional views of the

2 permanent side edge or separation heat sealing portion machine taken on lines 10—10 and 11—11, respectively, in Fig. 5.

Fig. 12 is a fragmentary side elevational view showing the side edge or transverse separation heat sealing operation between the bag sections.

Fig. 13 is a cross-sectional view of the portion of the machine for severing the individual package along the transverse separation sealing taken on line 13—13 in Fig. 6, the shears being shown in dotted lines in closed position.

Fig. 14 is a sectional view showing the filling and charging portion of the machine as seen at lines 14—14 in Fig. 1.

Figs. 15 and 16 are detail cross-sectional views taken on lines 15—15 and 16—16, respectively, in Fig. 14.

Fig. 17 is a fragmentary top plan view of a detail construction as seen along lines 17—17 in Fig. 5.

Figs. 18 and 19 are detail sectional views showing the preclosure and heat sealing of the top closure, respectively, taken on lines 18—18 and 19—19 in Fig. 8.

Fig. 20 is a cross sectional view taken on lines 20—20 in Fig. 3 showing the tea ball transfer portion of the machine.

Fig. 21 is fragmentary cross sectional view taken on lines 21—21 in Fig. 20.

Fig. 22 is a side elevation of the group delivery portion of the improved machine showing the tea balls being arranged and counted ready for shipment, and also showing a fragmentary sectional view of portions of the tea ball transfer carrier.

Fig. 23 is a fragmentary top plan view showing portions of the tea ball transfer carrier and the counter-discharge conveyer, and Figs. 24 and 25 are cross sectional views taken on lines 24—24 and 25—25 in Fig. 23.

Fig. 26 is a diagrammatic view showing a development of the cylinder cam stroke movement for reciprocating the sealing and cutting devices carrying crosshead on the slideway shown in Figs. 1 and 6.

Referring in detail to the drawing, 40 denotes generally a full automatic machine constructed to embody the invention and is seen to comprise cooperating mechanisms for making complete individual packages, such as tea balls M of the square pillow shaped type, on large scale production in continuous sequence at a rate of speed higher than heretofore, and delivering same segregated in counted groups ready for packing in containers.

As seen from Figs. 1 and 2, said machine 40 has a web of heat sealing filter paper, or similar suitable material 41, fed continuously thereto from a suitable supply source, as for example roll R, through a former 42 which provides a fold 41a longitudinally of said web 41. Said fold 41a forms a closed bottom and arranges opposite free longitudinally extending edge portions 41b into an open top.

The heat sealing filter sheet material forming web 41 for making tea balls M may be of any suitable foraminous construction, such as filter paper, perforated parchment paper or cellophane, cotton gauze and a like base layer treated or coated with a dry thermosetting plastic lamina.

Where a filter paper forms a base layer of sheet material web 41, it may be of the character such as described in the application of Theodore F. Menzel S. N. 335,694, filed May 17, 1940, now Patent No. 2,306,399, granted December 29, 1942, in which said base layer is made of vegetable fibrous pulp stock and coated with a dry porous lamina, so that when made into tea ball bags has sufficient wet strength to withstand immersions in boiling water without damage or disintegrations and without loss of tensile strength. The filtering sheet material 41 as above described when forming tea ball bags must be such as to permit ready infusion, that is, passage therethrough of the water of immersion for brewing and straining the filling or contents T of tea balls M, said sheet material 41 being of such composition that it is non-toxic, insoluble in hot boiling water, and imparts no odor or taste even to the slightest degree to the brew.

It has been found in practice that a 6½ pound fibrous stock sheet of approximately .001 inch thick of high wet tensile strength forms a practical filter paper base layer for the purposes described herein. On such layer finely powdered copolymer of vinyl chloride and vinyl acetate may be uniformly sprinkled or sprayed, "partially fused" by heat to 60° C., and pressure rolled thereon for providing a pervious, dry and extremely thin coating or lamina which does not materially affect the filtering capacity of said layer. Approximately three ounces of such vinyl powder for each pound of said layer will form a porous coating or lamina of normally less than .0005 inch thick.

The filter sheet material 41 after leaving the roll R has said coating or lamina on the folded web positioned to form the interior surfaces of the tea ball bags M so that the border edge joint seams may be pressure heat sealed on placing said dry surface coating in a face to face relation and applying pressure and heat to a fusion temperature. With a coating of lamina formed to the "partially fused" vinyl powder above described permanent sealing of the fused joint seams will take place when pressure and heat of approximately 130° C. is applied.

The web 41 with the fold 41a as it leaves the former 42 is gripped transverse the length thereof between continuously moving pairs of uniformly closely spaced pincer jaws 43 of machine 40, said jaws as shown in Figs. 2, 4 and 14, being mounted for movement toward and away from each other on spaced pivots 43a which are carried by link members 43b of an endless drive chain 43c running in a vertical plane. Said chain 43c extends about a tail sprocket 43d adjacent said former 42 and over and around a head sprocket 43e spaced from said sprocket 43d as shown in Figs. 1 and 20.

To control the effective opening and closing movement of said pincer jaws 43, each of said jaws is mounted on an arm 43f which has a roller 43g terminating its free end, suitable means, such as compression springs 43p shown in Fig. 20 being provided and installed between said arms 43f so as to tend to keep said jaws 43 separated or open when ineffective. The rollers 43g ride on spaced cam rails 43r as shown in Figs. 2, 4 and 20. Said cam rails 43r are rigidly supported on the frame or bed 40a of the machine 40 and extend horizontally along opposite sides of sprockets 43d and 43e and chain 43c.

To insure steady and smooth operation of the chain 43c and to retain the alignment thereof with respect to the rails 43r so that the closing movement of the pincer jaws 43 is made positively effective, each link member 43b just above the chain 43c may be provided with a cross projection piece 43j, the opposite free ends of which ride in side wall guide grooves 43k, as shown in Figs. 4, 6, 11, 14 and 20.

The tail sprocket 43d is continuously driven through suitable power transmission which as shown in Fig. 1 advances the chain 43c with closely spaced sets of pincer jaws 43. The business ends of said jaws 43 may be made U or forked shaped to firmly grip the folded web 41 temporarily about each of the lower or outlet ends of spaced funnel members 52 inserted within the folded web 41 as shown in Figs. 1 and 14 providing successive bag sections M1, one of such bag sections M1 extending between the forked portion of each pair of said jaws 43 with open top edges 41b of said bag sections M1 projecting above the upper level of the jaws 43.

The power transmission provided may include a main drive shaft 70 suitably supported on spaced bearings 70a from the frame of the machine 40. Said shaft 70 drives a counter shaft 71 also suitably supported on spaced bearing 71a from the machine frame through a set of gears 72. The counter shaft 71 through a worm and wheel drive 73 turns a drive shaft 43n on which the tail sprocket 43d is mounted.

The head sprocket 43e is mounted to rotate with a shaft 43m as shown in Fig. 1.

Located and arranged to travel continuously part way along the path of movement of said bag sections M1 retained by the pincer jaws 43 is a bag contents charging mechanism, denoted general at C. Said charging mechanism C may comprise an endless chain drive 50 which encircles a pair of spaced sprockets 51 each mounted to turn with a shaft 51a support from the machine frame 40a, as shown in Figs. 1, 2 and 14.

To drive the sprockets 51 and chain 50 of mechanism C, the power transmission above described may be extended through sprocket shaft 43n and a set of bevel gears 74 as shown in Fig. 2.

The chain drive 50 carries at space distances apart therealong said spouts or funnel member 52 which, as seen from Figs. 1, 2, 14 and 15, are constructed to move up and down vertically with respect to the chain drive 50 through slide connections 52a whereby said spouts 52 are caused when aligned to be successively entered and retracted from the underlying bag sections M1 during the advancing movement thereof through the machine 40. To guide the spout members 52 in the up and down movement thereof to their lowered position for extending into the bag sections M1 through the open tops thereof and to their elevated position above and free from the tops of said sections M1, suitable depressing and raising stationary cams are provided. These cams may comprise a lower guide portion 53a and an upper guide portion 53b which control the elevation of rollers 52c carried by the integral interconnecting parts 52b between the spouts 52 and the slide connecting 52a.

When the bag sections M1 during their continuous movements reach the position corresponding to the section lines 14—14 shown in Fig. 1 the cam portions 53a and 53b have fully depressed or lowered the outlet end of some of the spouts 52 between upfolded portions of the web 41 and the clamping action of the pincer jaws 43 has bowed said folded web 41 completely wrapping the latter about the exterior of the outlet portion of a spout 52 to form the open temporarily held bag section M1 as shown in Figs. 14 and 16. At the same time the upper ends or mouths 52d of the spouts 52 have been lowered under chutes 54 of a measuring and filling apparatus F there located which supplies uniform quantities or charges T of tea to said spouts for filling the bag sections M1. Any well known form of measuring and filling apparatus F may be used and connected in as shown in Figs. 1 and 14, the specific construction thereof not being shown.

After the spouts 52 are entered into the bag sections M1 as described, and the measuring and filling devices F operated to deliver charge T thereto through chutes 54 while advancing, then they are raised or retracted free from the bag top openings 41b while they travel continuously away from the path of movement of the filled bag sections, now denoted as M2, as is clear from Figs. 1 and 2.

Referring to Figs. 1, 3, 4 and 8, the filled bag sections M2 remain with spaced open top portions extending above and beyond the pincer jaws 43 and when they reach the portion of machine 40 corresponding to the section line 18—18 shown in Fig. 8 said open top portions of the bag sections M2 are temporarily closed before being heat sealed in order to provide a smooth permanent top closure entirely free from wrinkles. To this end there is provided along the path of movement of the filled open bag sections M2 a mechanism, which, as seen from Figs. 3, 4, 8 and 18, comprises spaced upstanding fingers 55. These fingers 55 are mounted to press the upper edges of the front side of the passing bag sections M2 and prepositions the same to conform to the shape of coacting dies 56a of a top heat sealer 56, as seen from Figs. 3 and 8.

Spaced fingers 55 of said temporary top closing mechanism are supported in position by adjustable screw connections 55a on a horizontally extending double ended arm 55b terminating the lower end of a lever 55c, the upper end of the latter being pivoted on shaft 55d carried on upright brackets or stanchions 57, as shown in Figs. 4, 4a and 8. The fingers 55 operate to and away from two adjoining filled bag sections M2 in the manner hereinafter described.

A coil tension spring 55e having one end anchored on pin 55m projecting from one said stanchion 57, the other end of which is secured on a pin 55j projecting from a hub of the lever 55c, provides continuous operating action of the fingers 55 toward the bag section M2 as shown in Figs. 4 and 8. To release said spring finger action there is provided a roller 55f mounted on an arm 55g which is fastened by screws 55h to one of the moveable dies 56a of a top sealer 56 so that when said dies 56a swing open the roller 55f contacts and moves the lever 55c with the fingers 55 away from the bag sections M2 against the action of the spring 55e, as shown in dotted line position in Fig. 4a.

After the filled bag sections M2 are temporarily closed while advancing, they pass between a moving set of dies 56a of the top heat sealer 56 and the top closures of the bag sections M2 are heat sealed, with a permanent closure 41c. Said dies 56a may be heated by suitable electric heaters H incorporated therein, as shown in Figs. 4 and 19. The top sealers 56, as here shown, comprise two adjoining sets of dies 56a so that top closures 41c are applied on two filled bag sections M2 simultaneously. Dies 56a are carried on the free lower ends of pairs of dependingly mounted arms 56b the upper ends of the latter being pivoted on a horizontally extending shaft 57a. Said shaft 57a is carried to move with the upright bracket stanchions 57, which are reciprocably mounted on a slideway 57c provided on machine frame 40a.

The arms 56b with dies 56a of the top sealer 56 are swung apart as shown in Fig. 4 in dotted lines by a double ended lever 56c which is pivoted at its midportion on shaft 55d. One end 56d of said lever 56c connects with the rear one of the arms 56b through a linkage, designated generally at 56g, the other end 56e connects with an operating lever 56h. Another link 56j connects the other or front arms 56b to the portion of lever 56c between the shaft 55d and lever end 56e, and shown in Figs. 4 and 7.

The end of lever 56j may be formed with oppositely projecting portions 56p which engage in sockets 56q provided in the front arms 56g of each set of dies 56a to form a loose connection assuring free movement without binding thereat. Pairs of spaced tension springs 56r may be provided to span said arms 56b as shown in Fig. 7 for continuously urging said arms 56b together.

To actuate the top sealer 56, the operating lever 56h, which is horizontally disposed as shown in Fig. 4, connects with a vertically extending arm 56k. The latter is mounted for oscillation on a stationary shaft 80 supported horizontally from the machine frame on pillow blocks 80a as shown in Fig. 2.

The arm 56k may be resiliently controlled by a tension spring 56m, and is moved against the action of said spring 56m by the means of a suitable revolving cam 81, the latter being mounted to turn with a cam shaft 82 supported from the machine from below the level of and parallelly spaced from shaft 80.

The cam shaft 82 may also be driven from the power transmission, as by means of gears 74 shown in dotted lines in Fig. 2 and in full lines in Fig. 1.

The results of operating the top sealer 56 above described produces bag sections M3, and as shown in Fig. 12 have the temporarily closed tops then permanently sealed at 41c.

Filled bag sections M3 with the top closures now permanently sealed at 41c continue uninterruptedly to advance through the machine 40 and when they come into alignment with another moving set of dies 58a of side edge or separation sealer 58, the temporarily retained transversely extending closures formed between adjoining bag sections by the gripping action of the pincer jaws 43 are permanently heat sealed. The results of the above described operation, as shown in Fig. 12, is seen as forming permanently heat sealed transversely extending side edges or separation 41d between the adjacent filled bag sections M3, said separations 41d on the now formed bag sections M4 extending to intersect and join the permanently heat sealed top closures 41c. The sets of dies 58a of the separation sealer 58, as shown in Figs. 5, 10 and 11, are carried in a depending position on arms 58b which are pivoted on the shaft 57a, the latter also being supported by stanchions 57.

To swing the arms 58b with dies 58a of the separation sealer 58 apart, there is provided, as shown in Fig. 5, a double ended lever 58c which is pivoted at its midportion on shaft 55d. One end 58d of said lever 58c through a link 58e connects at 58f with one of the front arms 58b, the other end 58g of said lever 58c through a linkage, designated generally at 58j, connects with an upper end 58t of a bell crank which is pivoted at 58u on an operating lever 58h. Another linkage 58m connects the other or rear arms 58b to the lever 58h through a shackle connection.

As shown in Figs. 5 and 17, the shackle connection at the upper lever end 58t to which the linkages 58j and 58m connect is seen to include a cross pin 58n which is moveably fitted in an elongated open ended slot 58p provided in lever end 58k. Said cross pin 58n carries on opposite ends thereof hinge straps 58q and 58s forming the shackle 58 connection with the linkages 58j and 58m, respectively. Alongside said hinge strap 58q and engaging the cross pin 58n said bell crank upper end 58t is connected. The other or lower end 58v of said bell crank has secured thereto one end of a tension spring 58w which has its other end anchored to said lever 58k at 58x. The above described construction permits yieldable spring pressure to be transmitted from the actuating lever 58k through said shackle connection to the arms 58b of separation sealer 58.

The lever 58h may be pivoted on shaft 80 as shown in Figs. 2 and 5, and has a lower extension 58z which cooperates with a suitable cam 83 mounted to turn with the cam shaft 82.

Filled bag sections M4 as they leave separation sealer 58 are now permanently heat sealed along all seam or partition joints and continue to advance through the machine 40. As they arrive in alignment with a moving cutting-off device 59, as shown in lines 6—6 in Fig. 3 and in Fig. 6, the leading two filled bag sections M4 are severed to provide the individual tea balls M.

Said cutting-off device 59 may comprise pairs of shears 59a which are pivoted at 59b and are operated through linkages 59c and bell-crank 59d. Said pivot 59b and another pivot 59e on which the bell-crank 59d is mounted are carried on a slideable upright bracket or stanchion 59f. The shears 59a, as shown in Figs. 13, 20 and 21 when closed severs heat-sealed separations 41d through a midportion thereof forming the transverse side edges joints 41e of the finished individual tea ball M.

The bell-crank 59d may connect through a suitable shackle linkage connector 59h with a lever 59j pivoted on shaft 80 as shown in Fig. 2 and has a lower extension which cooperate with a suitable cam 84 like cam 83 above described mounted to turn with the cam shaft 82.

The slideable stanchions 57 and 59f carrying the top sealer 56, separation sealer 58, and cutting off device 59 are mounted to reciprocate with the crosshead 57b moveable along the slideway 57c which extend parallel to the direction of the path of movement of the bag sections and tea balls carried by the pincer jaws 43 along opposite sides thereof, said slideway 57c being supported on the machine frame 40a. As shown in Fig. 1 the crosshead 57b has a depending portion 57c which rides in a groove 57d provided in the surface of a cylindrical cam 57e, the latter being mounted on a shaft 57f between spaced pillow block bearings 57g which are secured to extend from the machine frame 40a below the level of the slideway 57c. On rotation of shaft 57f, the crosshead 57b reciprocates along the slideways 57c carrying the stanchions 57 and 59f with top sealer 56, separation sealer 58 and cutting device 59. A development of the stroke movement provided by said cylindrical cam 57e is shown in Fig. 26.

The shaft 57f, as seen from Figs. 1 and 2 not only carries one of the gears 74 through which the cam shaft 82 is driven but also forms part of the power transmission through connection with another of the gears 74 mounted on a short intermediate shaft 76 which in turn is driven from the counter shaft 71 by suitable means such as meshing gears 75. The shaft 76 may be journaled in spaced bearing 76a supported from the machine frame 40a.

A rotable turret carrier 60 transfers the tea balls M as they reach the end of their travel on moving pincer jaws 43 to suitable belt conveyer 61 as shown in Figs. 20 to 25.

The carrier 60, as seen from Figs. 2, 20 and 22 comprises a suitably constructed wheel 60a mounted to turn with the upper end of a vertical shaft 60b which is journalled in sleeve bearing 60c rigidly secured to the machine frame 40a by bolts 60d. Through an extension of the head sprocket shaft 43m carried in a horizontally disposed bearing 60e forming part of said machine frame 40a, and a pair of bevel gears 60f, said shaft 60b and wheel 60a is driven.

Wheel 60a carries uniformly spaced radially extending gripping members 60g, which as seen in detail in Figs. 20 and 22, may comprise double ended levers 60h, each pivoted at 60j at a midportion of the wheel 60a. Said levers 60h have their upper ends each connected with a swingable jaw 60k through links 60m, said jaw 60k being pivoted at 60n to extend down at the periphery of the wheel 60a for releasable gripping the top sealed ends 41c of the tea balls M against said wheel periphery.

The levers 60h each extend down through an opening provided in the wheels 60a and carries a roller 60p coacting with a fixed disc cam 60q mounted below the level of a wheel 60a on the sleeve bearing 60c, said cam 60q acts through lever 60h to swing the jaws 60k open to release the tea balls M from the suspended position at the periphery of wheel 60a. Tension springs 60r provided for said levers 60h for urging the jaw 60k into gripping positions, said springs 60r may have one end of each secured to the upper end of the lever 60h, the other end of each spring 60r being anchored at eyelet screw 60t carried by the wheel 60a as shown in Fig. 20.

The transfer carrier 60 is located to move the gripper jaws 60k in the path of advancing movement of the tea balls M held between the pincer jaws 43, said tea balls M being released from the jaws 43 are picked up by said carrier and transferred to the conveyer 61 at which time the cam 60q act to swing the gripper jaws 60k through the operation of levers 60h from the position shown in Fig. 20 to that shown in Fig. 22. The conveyer 61 receives the tea ball M on belt 61a which is extended over a drive pulley 61c and an idler pulley 61d spaced therefrom, said pluleys 61c and 61d being supported from the frame 40a of the machine 40 as shown in Figs. 2 and 22.

The conveyer drive pulley 61c may connect with the power transmission above described by providing a suitable right angle drive from an end of the intermediate shaft 76, as for example, through helical gears 77 to a cross shaft 78, as shown in Fig. 1, said cross shaft 78 through sprocket and chain drive 79, intermittent cam operated racket and pinion drive 79a and direct sprocket and chain drive 79b providing the power to said drive pulley 61c as shown in Figs. 1, 2 and 22.

The conveyer 61 may be constructed to operate in the manner shown in detail and described in my copending application Ser. No. 379,013, filed February 15, 1941, now abandoned. Tea balls M when so transferred are deposited on the conveyer 61 in overlapping groups of predetermined numbers, as for example in 5 or 10 tea balls M in each group as desired. Thus the necessity of counting the individually finished tea balls M is eliminated and an operator stationed at said conveyer 61 simply scoops up one or more of such counted groups of tea balls M and places them in a container for shipment in the well understood manner.

Since machine 40 when in operation is capable of manufacturing tea balls M at a high rate of production, instead of having only one conveyer 61, two parallelly extending conveyers may be used in which case the carrier 60 would be constructed to deliver two tea balls M simultaneously, one to each of such conveyers.

As seen from Figs. 22 to 25, the tea balls M are not just released from the carrier 60 onto the conveyer belt 61a but they are guided and positioned so that when released they will be positively controlled to be positioned by laying in alignment on said belt 61a. To this end there is provided an aligning guide plate 62 carried by a relatively fixed part of the carrier 60. As seen from Figs. 22 through 25, said plate 62 serves to swing successive moving tea balls M back from a vertical depending position and guide the lower end of each tea ball M into a leveling position with respect to the belt 61, so that when released the tea balls M will positively be laid, that is, accurately deposited into the desired delivery alignment shown in Figs. 22 and 23.

From construction and assembling of the improved machine 40 as shown in the drawing and as described above, the method of manufacturing tea balls M and the operation of said machine 40 will be readily understood. The filter paper sheet material 41 with the dry porous, "partial fused" thermosetting plastic lamina coating as it comes from the supply source, roll R, is folded longitudinally by former 42. The folded web 41 as it leaves the latter is engaged by the moving pairs of closely spaced pincer jaws 43 which are caused to grip the same in wrapped around position on the lower end portions of the funnels 52 on raising of arms 43f when the rollers 43g ride on the rails 43r at a level to swing said jaws 43 on the pivots 43a, as shown in Figs. 1, 5, 6, 14 and 20.

The portions of the folded web 41 between the forks of the pincer jaws 43 form temporary bag sections M1 with open tops extending above the level of said pincer jaws 43. When said open top bag sections M1, during their continuous movement approach the charging mechanism C, the moving spouts 52 have already been successively lowered and entered by the actions of cams 53a and 53b between the folded web 41 forming said travelled bag sections M1 as above described and shown in Figs. 2 and 14. When bag sections M1 come into alignment with chutes 54, the filling apparatus F, which has been actuated, delivers a measure quantity of tea T to the bag sections M1 through said chutes 54 and spouts 52. In the construction here shown and described, two chutes 54 are used for simultaneously filling two consecutive aligning bag sections M1.

As the filled bag sections M2, continue to advance the spouts 52 are retracted to a position above the level of the bag section tops so as not to interfere with the continuous advancing movement thereof. When said bag sections M2 reach a position corresponding to that shown in Fig. 8, the sets of fingers 55 which are then in position to advance with the bag section M2 act to inwardly bow the front portions of the open tops thereof. The adjoining bag sections M2 have concurrently had their temporarily closed tops permanently heat sealed by the dies 56a of the top sealer 56, which also was in position to advance with the corresponding bag sections as shown in Fig. 4. The temporary closure action by the fingers 55 and top heat sealing takes place simultaneously on two adjoining bag sections M2 and two bag sections M3 because the roller 55f carried on the arm 55g permits the lever 55c to swing into effective position under the influence of the spring 55e. See Figs. 4 and 8.

Since the bag sections advance through the machine continuously without interruption, the temporary closure action of the fingers 55 and the application of top permanent heat seal closures 41c by the sealers 56 take place after each return movement or stroke of the sliding stanchions 57 which carry said fingers 55 and top sealer 56, that is, during the movement of the crosshead 57b in the same direction as the advancing of said bag sections through the machine.

Meanwhile, the next two adjoining bag sections M4 in advance of said bag sections M3 have had concurrently their separations or partition side edges 41d permanently heat sealed, transverse the fold web 41 and between adjoining bag sections M3 retain by pincer jaws 43, by separation sealer 58 which is also carried by sliding stanchions 57. This latter heat sealing by separation sealer 58 takes place simultaneously with the heat sealing of the top on the two bag sections M3 following but are applied subsequent to the permanent sealing of the tops on the specific bag sections M4.

The cutting device 59 carried on sliding stanchion 59f is also moved by the crosshead 57b in unison with the top sealer 56 and separation sealer 57, and severs the separation sealed portion 41d of the filled bag sections M4 leaving an individual tea ball M between each pair of pincer jaws 43. When said tea balls M reach the transfer carrier 60 which extends into the path of their advancing movement, they are released from the grip of said pincer jaws 43 by the action of springs 43p and immediately are picked up by the gripping action on the sealed top 41c by the carrier 60 between the moving jaws 60k and the periphery of the wheel 60a. Said carrier 60 transfers the tea balls M at the uniform rate of their manufacture and positions them on the conveyer belt 61a. Because of its intermittent travel due to the particular drive of pulley 61c, said tea balls M are segregated in predetermined groups or counts in overlapping relation. An operator then at a glance is able by simply scooping up one or more groups of tea balls M to place them in a container for shipment without the necessity of counting the individual tea balls M being picked up.

As described above a preferred practical application of the invention is utilized in machine 40 by operating on a plurality of bag sections simultaneously for filling, heat sealings of the top closures and partitioning seams, and severing to produce the individual tea balls. It is to be understood that a simpler machine of less production capacity may be constructed to embody the invention operating on a single bag section instead of on two simultaneously, and also that a machine of higher capacity may be constructed to embody the invention operating on three, four, etc. bag sections by incorporating a correspondingly different multiple of filling apparatus, top sealers, partition sealers and cutters.

It is thus therefore seen that there is provided an improved method of manufacture and a machine in which the objects of the invention are achieved and which are well adapted to meet all conditions of practical use.

As various possible embodiments may be made in the above invention for use for different purposes and as various changes might be made in the embodiments and method above set forth, it is understood that all the above matters here set forth or shown in the accompanying drawing are to be interpreted as illustrative and not in a limiting sense.

Thus having described my invention, I claim as new and desire to secure by Letters Patent:

1. In a machine for manufacturing infusion packages, means for temporarily forming bag sections with open tops, means for successively filling said bag sections each with a product through said top, means for applying permanent heat sealing closures to said open tops, means for heat sealing spaced partition seam joints to replace the temporarily formed portions of the bag sections and to permanently enclose said product, and means for cutting said partition seams joints through a mid-portion thereof to provide individual sealed filled packages.

2. In the machine for manufacturing infusion packages as defined in claim 1, including means for forming preclosures at said open tops of the filled bag sections prior to applying the permanent heat sealing closure means.

3. In the machine defined in claim 1 including means for actuating said heat sealing and severing means with said open top arranged in substantially straight line movement in the passage of the bag section through the machine.

4. In the machine for manufacturing infusion packages, means for forming continuous strip of filtering sheet material with a longitudinal folded bottom and opposite free longitudinally extending edge portions into an open top, sets of means for gripping said folded strip transverse the length at space distances apart to provide a series temporarily held bag sections and for advancing the same through the machine, filling members mounted to travel along the path of movement of said bag sections and spaced to be inserted into the open top for filling said bag sections while in motion, means for heat sealing closures at the open tops of said temporarily held bag section, and means for heat sealing spaced partition seam joints to extend transverse the top sealed closure of each bag section between said sets of gripping means with the top sealed closure advancing through the machine in substantially a straight line.

5. In the machine for manufacturing infusion packages means for forming a continuous strip of filtering sheet material with a longitudinal fold bottom closure and opposite free longitudinally extending edge portions into an open top, sets of means for gripping said folded strip transverse the length at space distances apart to provide a series of temporarily held bag sections and for advancing the same through the machine, filling members mounted to travel along the path of movement of said bag sections and spaced to be inserted into the open top for filling said bag sections while in motion, means for heat sealing closures at the open tops of said temporarily held bag section, means for heat sealing spaced partition seam joints to extend transverse the top sealed closure of each bag section between said sets of gripping means with the top sealed closure advancing through the machine in substantially a straight line, and means for severing said partition seam joints through a midportion thereof to provide individually sealed and filled packages.

6. A machine for manufacturing infusion packages comprising means for continuously moving a strip of filtering sheet material through the machine, means for forming said strip with a closed bottom and open top, means travelling in aligned relation with respect to said strip moving means insertable into the open top for charging the bag sections, said strip moving means including portions for temporarily holding said formed strip wrapped about said filling means and extending spaced distances apart to provide a series of bag sections, means for heat sealing successive open tops of the charged bag sections, means for simultaneously heat sealing spaced partitioning seams between said temporarily held portions to permanently enclose each charge in a bag section, and cutters for severing said partitioning seams through a midportion thereof to provide individually sealed filled packages.

7. A machine as defined in claim 6 including means for moving the open tops to closed positions prior the heat sealing thereof.

8. In a machine for manufacturing infusion packages, means for forming temporarily held bag sections having open tops from strip sheet material and for advancing same in a continuous interconnected series through the machine, filling means mounted to travel along the path of movement of said bag section constructed and arranged to be inserted into and out of said open tops while the interconnected bag sections are in motion, said bag section forming means serving to wrap the sheet material about the filling means when in the inserted position, means for first heat sealing closures at the open top of the temporarily held bag sections, and means for heat sealing the temporarily retained transversely extending closures formed between adjoining bag sections after said top closure means operates.

9. In a machine for manufacturing infusion packages, means for forming a continuous strip of filtering sheet material with a longitudinal fold having a closed bottom and an open top of the opposite free longitudinally extending edge portions, means for gripping said folded strip transverse the length at spaced distances apart to provide a series of temporarily held interconnected bag sections having top openings and for advancing the same through the machine, filling members mounted to travel along the path of movement of said bag sections and spaced to be inserted into the open top for filling said bag sections while in motion, said gripping means being so constructed and arranged when effective to wrap the bag sections about the inserted filling members, means for heat sealing said top opening of the temporarily held interconnecting sections, and means for heat sealing the transversely extending closure of said temporarily held sections after said top sealing means is made effective.

10. The method of manufacturing of the character described comprising the steps of forming bag sheet material into a continuously folded strip with a closed bottom and open top, inserting and retracting moving filler members into said folded strip through the top opening while said strip is kept moving, wrapping said folded strip about each moving filler member while inserted in said folded strip by temporarily retaining spaced apart transversely extending portions of the folded strip to form adjoining bag sections, depositing charges of a material through the filler members into each of said bag sections, heat sealing a permanent closure at said open top, permanently heat sealing spaced apart side edge separation closures between the adjoining bag sections to form filled package sections while moving in a substantially straight line and while said temporarily retaining of the folded strip transversely extending portions is effective, and severing said side edge separation closures midway therealong to provide a succession of individually filled sealed packages.

11. The method of manufacturing defined in claim 10 in which said depositing of charges and permanently heat sealing of the open tops and separation side closures are carried through simultaneously in duplication on consecutive bag sections.

12. In the method of manufacturing of the character described, the steps of forming coated filter bag sheet material into a folded strip with a closed bottom and open top while continuously moving, wrapping said folded strip about filler members inserted into said open top by retaining spaced apart transversely extending portions of the folded strip to provide temporarily formed adjoining bag sections, depositing a charge of a product through each of such members into the temporarily formed bag sections, permanently heat sealing successively the open top of each bag section and side edge closures between said adjoining bag sections to form filled package sections while continuing the movement thereof in substantially a straight line, and severing the side edge closure midway therealong to provide a succession of individually filled sealed packages.

13. In the method of manufacturing infusion packages of the character described, the steps of first heat sealing a permanent closure at an open top portion of a folded strip while temporarily retaining a charge of a product between spaced apart transversely extending portions thereof to form adjoining bag sections, and then permanently heat sealing side edge separation closures between said adjoining bag sections to form package sections while moving with the heat sealed top closures in substantially a straight line.

14. In the method of manufacture defined in claim 12, in which a plurality of charges of said infusion product are simultaneously deposited in adjoining bag sections between said coated filter paper sheets, and in which the top opening and side edge closures are permanently heat sealed simultaneously in multiple on consecutive bag sections.

15. The method of manufacturing infusion packages in continuous unbroken sequence from a moving web of filter paper having a porous thermo-plastic sealing coating comprising the steps of folding the web with a closed bottom and open top, temporarily retaining spaced predetermined portion transverse of the folded web to provide package bag sections, moving charges of an infusion product in the path of movement of said sections, filling said sections with said charges while being moved, heat and pressure sealing said top to form a permanent closure thereat, heat and pressure sealing said temporarily retained transverse portions to provide permanent separation closures for the package sections, and severing the leading filled package section midway along said separation closures successively to provide individual sealed packages.

HANS O. IRMSCHER.

REFERENCES CITED

The following references are of record in the file of this patent:

UNITED STATES PATENTS

| Number | Name | Date |
|---|---|---|
| 199,645 | Heeren | Jan. 29, 1878 |
| 918,642 | Armstrong | Apr. 20, 1909 |
| 974,648 | Feeman | Nov. 1, 1910 |
| 1,232,422 | Halvorsen | July 3, 1917 |
| 1,485,141 | Macdonald | Feb. 26, 1924 |
| 1,486,598 | Milmoe | Mar. 11, 1924 |
| 1,572,257 | Van Buren | Feb. 9, 1926 |
| 1,625,461 | Files | Apr. 19, 1927 |
| 1,696,020 | Van Buren | Dec. 18, 1928 |
| 1,889,846 | Wright | Dec. 6, 1932 |
| 2,027,643 | Howard | Jan. 14, 1936 |
| 2,095,938 | Schmitt | Oct. 12, 1937 |
| 2,133,189 | Dalton | Oct. 11, 1938 |
| 2,139,039 | Salfisberg | Dec. 6, 1938 |
| 2,146,831 | Maxfield | Feb. 14, 1939 |
| 2,149,713 | Webber | Mar. 7, 1939 |
| 2,156,466 | Vogt | May 2, 1939 |
| 2,213,602 | Yates | Sept. 3, 1940 |
| 2,269,532 | Howard | Jan. 13, 1942 |
| 2,269,533 | Howard | Jan. 13, 1942 |
| 2,330,361 | Howard | Sept. 28, 1943 |